July 20, 1937.   B. F. TOFFLEMIRE   2,087,458
PARACHUTE RELEASE SAFETY DEVICE
Filed Oct. 24, 1935
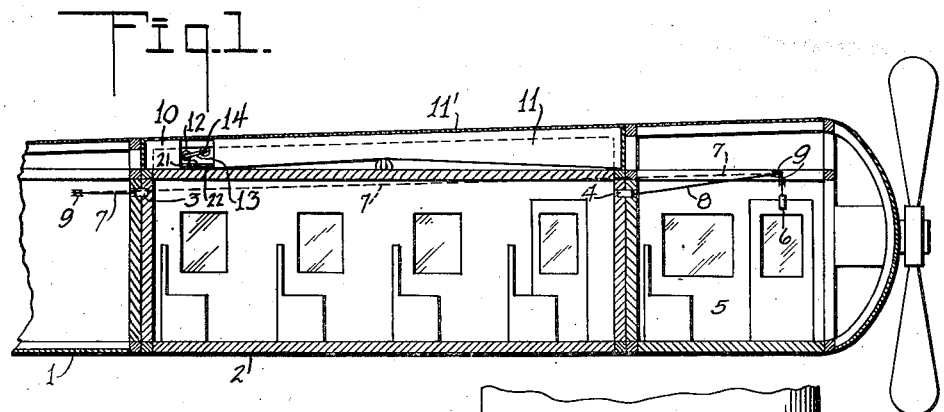
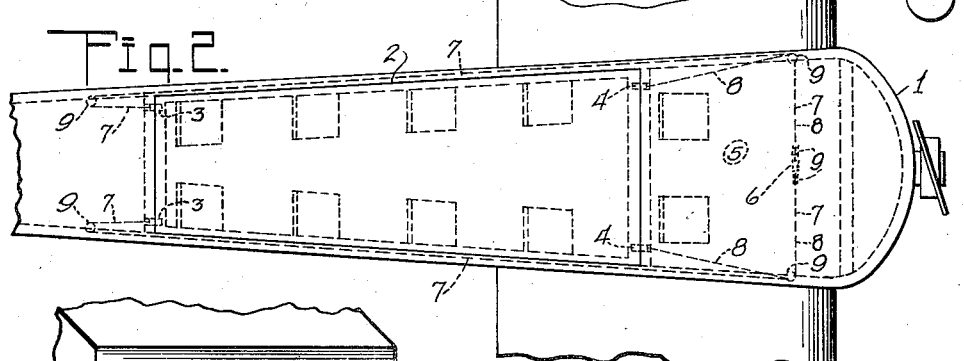
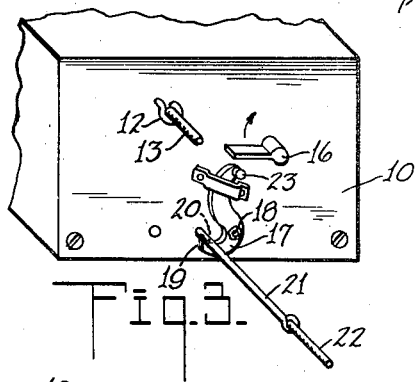
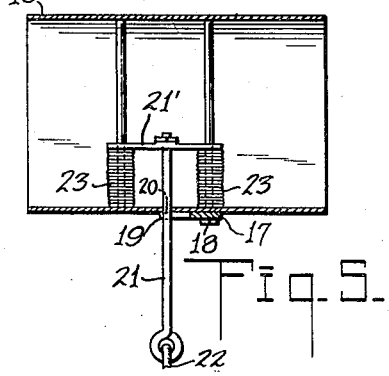
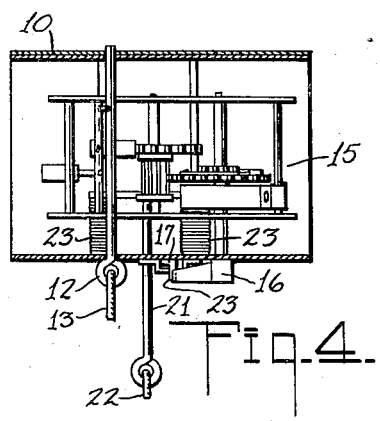
INVENTOR.
BENJAMIN F. TOFFLEMIRE
BY Munn, Anderson & Liddy
ATTORNEYS.

Patented July 20, 1937

2,087,458

UNITED STATES PATENT OFFICE 2,087,458

PARACHUTE RELEASE SAFETY DEVICE

Benjamin F. Tofflemire, Berkeley, Calif.

Application October 24, 1935, Serial No. 46,605

1 Claim. (Cl. 244—140)

My invention relates to improvements in parachute release safety devices, and it consists of the combinations, constructions and arrangements hereinafter described and claimed.

An object of my invention is to provide an improvement over my patent issued April 14, 1931, Patent No. 1,800,575. In the patent I show a parachute designed to be strapped to a person's back, this parachute carrying a timing mechanism that is set into operation as soon as the person leaves the seat in which he is sitting. The timing mechanism is connected to the rip cord of the parachute, and will automatically actuate the rip cord for opening the parachute at a predetermined time interval after the person leaves the seat. This does away with the necessity of the person manually pulling the rip cord after he has freed himself from the airplane.

In the present invention I show a passenger compartment removably secured to an airplane, and this compartment is freed from the airplane by the pilot actuating a release device. The compartment carries a timing mechanism and a parachute. The timing mechanism is connected to the plane so that when the compartment is freed from the plane this connection will start the timing mechanism to functioning. The timing mechanism is also connected to the rip cord of the parachute, and will actuate the cord a predetermined time interval after the timing mechanism starts functioning. This time interval is such as to permit the compartment to clear the airplane before the parachute is opened. This will prevent the parachute from becoming fouled in the plane. The parachute is large enough to support the compartment with its passengers and to gently lower the compartment to the ground.

The device is extremely simple in construction and is durable and efficient for the purpose intended.

Other objects and advantages will appear in the following specification, and the novel features of the device will be particularly pointed out in the appended claim.

My invention is illustrated in the accompanying drawing forming a part of this application, in which Figure 1 is a longitudinal section through an airplane showing the device operatively connected to a removable compartment;

Figure 2 is a top plan view of the plane;

Figure 3 is a perspective view of one end of the timing mechanism;

Figure 4 is a horizontal section through a portion of the timing mechanim; and

Figure 5 is another horizontal section through the timing mechanism.

In carrying out my invention I provide an airplane 1, and this plane is provided with a removable passenger compartment 2. The compartment 2 is temporarily locked to the plane 1 by rear bolts 3—3 and front bolts 4—4. I provide simple means for retracting the bolts 3—3 and 4—4 for freeing the compartment 2. This means consists of an actuating handle placed in the pilot's compartment 5. The handle 6 is connected to cables 7—7 which are passed around pulleys 9, and are connected to the rear bolts 3—3. A second set of cables 8 are also connected to the handle 6, and are passed over certain of the pulleys 9, and have their ends connected to the bolts 4—4. It will be seen from this construction that a downward pull upon the handle 6 by the pilot will retract the bolts 3—3 and 4—4 and free the compartment 2 from the plane. Any other suitable releasing mechanism may be employed without departing from the spirit and scope of the invention.

I provide a timing mechanism, and this mechanism is mounted in a casing 10 which, in turn, is secured to the compartment 2. A parachute 11 is also mounted on top of the compartment 2. The casing 10 and the parachute 11 are temporarily housed under a cover 11' which forms a part of the top of the airplane.

In Figures 3 to 5 inclusive I show in detail the timing mechanism. Figure 4 shows a starting pin 13 mounted in the casing 10 and connected by means of a cord 13 to a portion of the plane 1. Figure 1 shows the cord 13 connected to an eyelet 14 which, in turn, is connected to the plane 1. When this starting pin 12 is removed it will permit a clock mechanism indicated generally at 15 to function. This clock mechanism when functioning will rotate a tripper 16 in the manner clearly set forth in my patented device. The tripper 16 rotates in a clockwise direction as shown by the arrow in Figure 3. This tripper when making a complete revolution strikes a projection 23 carried by a catch 17. The catch is pivoted at 18 to a wall of the casing 10, and the catch is normally received in a notch 20 formed in a rod 21. Figures 3 and 5 show the head 19 of the catch 17 entering the notch 20.

Figure 5 shows the rod 21 slidably mounted in the casing 10 and carrying arms 21' which will compress the springs 23. When the catch 17 is freed from the notch 20 the springs 23 will instantly expand and will move the rod 21. The moving of the rod 21 will actuate a rip cord 22, which in turn is connected to the parachute 11.

From the foregoing description of the various parts of the device, the operation thereof may be readily understood.

The airplane 1 resembles the standard airplane with the exception that the passenger compartment 2 is removable therefrom as a unit. The compartment 2 is only released from the plane 1 in case of accident, and this releasing will remove the starting pin 12 from the casing 10. The cover 11' is merely in the form of a sheet metal and will free itself from the compartment soon after the compartment is freed from the plane. This will expose the parachute 11. The removal of the starting pin 12 causes the clock mechanism to function and to rotate the tripper 16 in the manner already set forth. After a predetermined time interval the tripper will free the catch 17 from the rod 21 and the springs 23 will actuate the rip cord 22 for opening the parachute 11. The parachute 11 will now support the compartment 2 and will lower the compartment gently to the ground.

It is obvious that the device is adapted to handle packages in place of the compartment 2. Each package will have its own timing mechanism 10, and its parachute 11. The freeing of the package from the plane will start the functioning of the timing mechanism. The timing mechanism in turn will open the parachute 11 after the package has had time enough to clear the plane.

While I have shown only the preferred form of my invention, it should be understood that various changes or modifications may be made within the scope of the appended claim without departing from the spirit of the invention.

It is obvious that the timing mechanism can close a circuit to an electrically operated release device instead of the spring release. This would be adapted to larger installations than the type shown in the drawing.

I claim:

An airplane having an opening extending entirely therethrough from the top to the bottom of the body, a compartment removably disposed in the opening and being designed to leave the opening from either end, a folded parachute connected to the compartment, a timing mechanism carried by the compartment, a stop for preventing the timing mechanism from functioning, means connecting the stop with the airplane for removing the stop to permit the timing mechanism to function when the compartment leaves the opening, a rip cord pulling member held against operation by the timing mechanism, said timing mechanism freeing the rip cord pulling member for permitting the parachute to open after a predetermined time interval, means for normally securing the compartment to the airplane, and manually controlled means for releasing said compartment holding means.

BENJAMIN F. TOFFLEMIRE.